United States Patent
DeMarie et al.

(10) Patent No.: US 10,649,933 B1
(45) Date of Patent: May 12, 2020

(54) SELECT STATE DETECTION AND SIGNAL GENERATION

(71) Applicant: INTERNATIONAL BUSINESS MACHINES CORPORATION, Armonk, NY (US)

(72) Inventors: Mark L. DeMarie, Poughkeepsie, NY (US); Robert B. Schlak, Hyde Park, NY (US); David Fratzke, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/390,620

(22) Filed: Apr. 22, 2019

(51) Int. Cl.
*G06F 13/40* (2006.01)
*G06F 13/42* (2006.01)
*G06F 13/20* (2006.01)

(52) U.S. Cl.
CPC .......... *G06F 13/20* (2013.01); *G06F 13/4068* (2013.01); *G06F 13/4282* (2013.01); *G06F 2213/0016* (2013.01)

(58) Field of Classification Search
CPC .. G06F 13/20; G06F 13/4068; G06F 13/4282; G06F 2213/0016
See application file for complete search history.

(56) References Cited

U.S. PATENT DOCUMENTS

| | | | |
|---|---|---|---|
| 6,092,138 A * | 7/2000 | Schutte | G06F 13/00 710/113 |
| 6,311,296 B1 | 10/2001 | Congdon | |
| 6,453,429 B1 | 9/2002 | Sadana | |
| 6,496,890 B1 * | 12/2002 | Azevedo | G06F 13/28 710/107 |
| 7,082,488 B2 | 7/2006 | Larson et al. | |
| 7,761,728 B2 | 7/2010 | Cagno et al. | |
| 7,900,096 B2 | 3/2011 | Cardwell et al. | |

(Continued)

FOREIGN PATENT DOCUMENTS

| | | | | |
|---|---|---|---|---|
| JP | S5816493 B2 * | 3/1983 | ....... | G06F 15/17343 |
| JP | H0463419 B2 * | 10/1992 | | |

(Continued)

OTHER PUBLICATIONS

IBM Technical Disclosure IPCOM000176237D 'Freeing a Serial Bus Hang Condition by Using a Charge Pump to Enable Drivers' Nov. 10, 2008. (Year: 2008).*

(Continued)

*Primary Examiner* — Steven G Snyder
(74) *Attorney, Agent, or Firm* — Tihon Poltavets, Esq.; Blanche E. Schiller, Esq.; Heslin Rothenberg Farley & Mesiti P.C.

(57) ABSTRACT

A device to detect a select state and initiate a function based on detecting the select state. The device receives a signal sent over a bus to be used to communicate between one component of one unit and another component of another unit. The bus is defined based on a selected protocol, and the device is configured to communicate with the other component of the other unit. A determination is made as to whether the signal represents a select state, the select state being an unintended state of the bus. Based on determining that the signal represents the select state, a function is initiated.

20 Claims, 7 Drawing Sheets

(56) References Cited

U.S. PATENT DOCUMENTS

| | | | |
|---|---|---|---|
| 8,250,412 B2 | 8/2012 | Cheng et al. | |
| 8,259,412 B2 | 8/2012 | Cheng et al. | |
| 9,275,000 B2* | 3/2016 | Cala' | G06F 13/4291 |
| 9,665,528 B2* | 5/2017 | Freudenberger | G06F 13/4291 |
| 9,740,658 B2* | 8/2017 | Freudenberger | G06F 13/4291 |
| 9,875,165 B2* | 1/2018 | Huang | G06F 11/2007 |
| 9,965,420 B2* | 5/2018 | Liu | G06F 13/362 |
| 2003/0148801 A1 | 8/2003 | Deyring et al. | |
| 2007/0240019 A1 | 10/2007 | Brady et al. | |
| 2011/0208885 A1 | 8/2011 | Kwek et al. | |
| 2012/0137022 A1* | 5/2012 | Cala' | G06F 13/4291 710/3 |
| 2014/0337553 A1* | 11/2014 | Du | G06F 13/24 710/267 |
| 2015/0095537 A1* | 4/2015 | Sengoku | G06F 13/4295 710/110 |
| 2016/0147708 A1* | 5/2016 | Freudenberger | G06F 13/4291 710/110 |
| 2017/0046299 A1* | 2/2017 | Isaac | G06F 13/4068 |
| 2017/0109305 A1* | 4/2017 | Liu | G06F 13/4282 |
| 2017/0147453 A1* | 5/2017 | Huang | G06F 11/2007 |
| 2018/0203779 A1 | 7/2018 | Huang et al. | |

FOREIGN PATENT DOCUMENTS

| | | |
|---|---|---|
| JP | 2010055474 A | 3/2010 |
| JP | 5981004 B2 * | 8/2016 |

OTHER PUBLICATIONS

'The I2C-Bus Specification Version 2.1' by Philips Semiconductors, Jan. 2000. (Year: 2000).*

'KeyStone Architecture Serial Peripheral Interface (SPI) User Guide' by Texas Instruments, Mar. 2012. (Year: 2012).*

Anonymous, "Addressed Based I2C Recovery Device," IP.com No. IPCOM000215902D, Mar. 15, 2012, pp. 1-2 (+ cover).

IBM, "System for Detection and Recovery of I2C Bus Multi-Master Controller Hangs," IP.com No. IPCOM000191743D, Jan. 13, 2010, pp. 1-2 (+ cover).

IBM, "I2C Recovering Method," IP.com No. IPCOM000185999D, Aug. 5, 2009, pp. 1-3 (+ cover).

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

SELECT STATE DETECTION AND SIGNAL GENERATION

BACKGROUND

One or more aspects relate, in general, to facilitating processing within a computing environment, and in particular, to facilitating generation of signals to trigger functions.

Micro-controller units and other such components have limited pins on external cables, and signals across the cables are prone and sensitive to noise and other disturbances. Further, industry standard cabling is fixed, and additional interface signals or shielding are not to be added. Thus, there are limited cabling and signals available for use.

SUMMARY

Shortcomings of the prior art are overcome, and additional advantages are provided through the provision of a device. The device includes one or more circuits to detect a select state and initiate a function based on detecting the select state. The device is configured to receive a signal sent over a bus to be used to communicate between one component of one unit and another component of another unit. The bus is defined based on a selected protocol, and the device is configured to communicate with the other component of the other unit. A determination is made as to whether the signal represents a select state, the select state being an unintended state of the bus. Based on determining that the signal represents the select state, the function is initiated.

Methods, systems and/or computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to facilitate processing within a computing environment. For instance, utilizing an existing signal/bus architecture of an environment, select defined states of an entity, such as a signal or a bus, are detected. The select defined states are, for instance, invalid states (e.g., invalid states not reachable by the bus protocol as configured) or other unique states of the entity. As examples, in the case of a micro-controller unit (MCU), once pins are configured to a protocol, the select state is not reachable. However, the micro-controller unit can re-configure the pins such that they can be placed in the select state. Further, for other non-MCU applications where the hardware might be fixed, and not configurable, other external components may be used to force the select state (e.g., open-drain field-effect transistors). The select states are states not intended to be provided by the entity. For instance, if using a standard bus protocol, such as UART (Universal Asynchronous Receiver-Transmitter), I2C (Inter-Integrated Circuit Bus), CAN (Controller Area Network) or SPI (Serial Peripheral Interface), an invalid state is a select state. Other states and/or entities are possible.

Based on detecting a select state, additional useful signals are generated. These signals include, for instance, reset, interrupt, enable/disable, sleep/wakeup, etc. These signals automatically trigger the corresponding function (e.g., reset, interrupt, enable/disable, sleep/wakeup) for a component, such as a micro-controller unit, coupled to the entity. In one aspect, with limited cabling and interface signals available, additional signals are generated while maintaining robustness to environmental disturbances.

To detect a select state and generate a signal based thereon, in one example, a hardware device, referred to as a unique state detector (USD), is used, in accordance with an aspect of the present invention. As an example, this hardware device is coupled to a cable used to receive data transmitted between components, as described with reference to FIG. 1.

Figure 1:
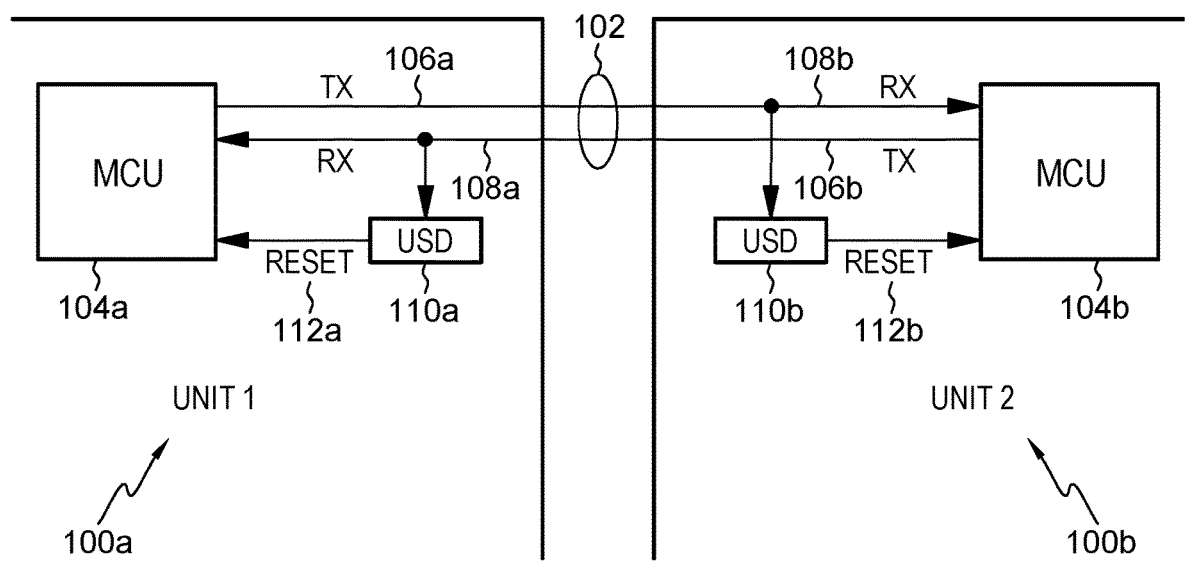
FIG. 1 depicts one example of micro-controller units coupled to one another and coupled to unique state detectors, in accordance with an aspect of the present invention.

Referring to FIG. 1, in one example, a unit 100a (Unit 1) is communicatively coupled to another unit 100b (Unit 2) via at least one bus 102. Specifically, in one example, one component, such as a micro-controller unit (MCU) 104a, of unit 100a is communicatively coupled to another component, such as a micro-controller unit (MCU) 104b, of unit 100b via bus 102. Bus 102 includes a plurality of cables, such as a transmit (TX) cable (106a, 106b) and/or a receive (RX) cable (108a, 108b) used to transmit and/or receive data. As shown, each cable is used to transmit and receive data.

In accordance with an aspect of the present invention, receive cable 108a is coupled to a unique state detector (USD) 110a and receive cable 108b is coupled to a unique state detector (USD) 110b. Unique state detector 110a/110b is configured to detect a select state received on receive cable 108a/108b and to initiate a function, such as reset 112a, 112b, based thereon.

Figure 2:
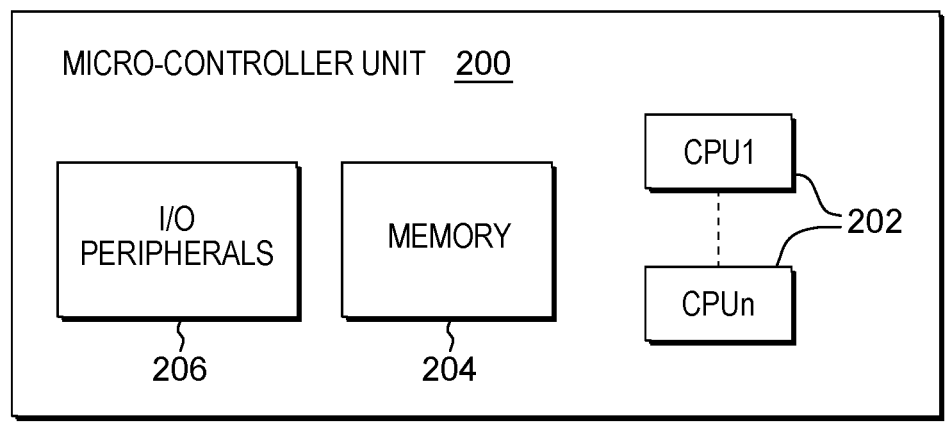
FIG. 2 depicts further details of a micro-controller unit of FIG. 1, in accordance with an aspect of the present invention.

Further details relating to a micro-controller unit are described with reference to FIG. 2. As depicted, in one example, a micro-controller unit 200 (such as micro-controller unit 104a or 104b) includes one or more processors (e.g., central processing units (CPUs)) 202, memory 204 and one or more input/output peripherals 206, one or more of which may be coupled to one another via, e.g., one or more buses and/or other connections. Micro-controller unit 200 is, for instance, a small computer on a single integrated circuit, which may be used, for example, in computing environments and automatically controlled products and devices, such as, but not limited to, automobile engine control systems, implantable medical devices, remote controls, office machines, appliances, power tools, and other embedded systems.

Returning to FIG. 1, as shown, one micro-controller unit (e.g., MCU 104a) transmits (TX) data via a transmit cable 106a to another micro-controller unit (e.g., MCU 104b) that receives (RX) the data via receive cable 108b. In accordance with an aspect of the present invention, receive cable 108b (as well as receive cable 108a of MCU 104a) is coupled to a detector, such as unique state detector 110b to detect a select signal and trigger a function based thereon. Further details regarding a unique state detector, such as unique state detector 110b, or 110a, are described with reference to FIG. 3.

Figure 3:
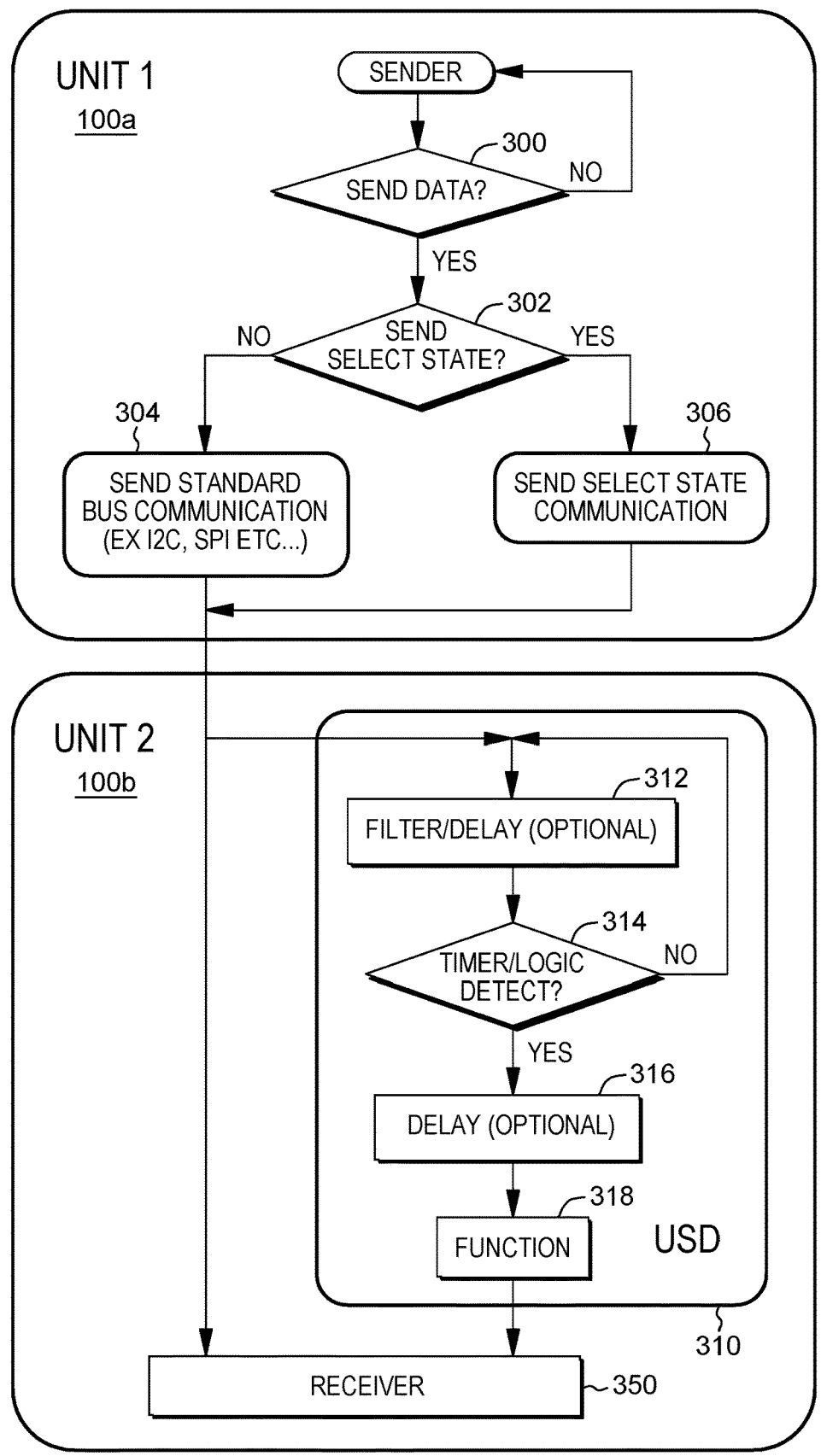
FIG. 3 depicts further details of a unique state detector of FIG. 1, in accordance with an aspect of the present invention.

Referring to FIG. 3, a unit, such as Unit 1 (100a), is a transmitting unit and, as such, a determination is made as to whether there is data to send, INQUIRY 300. If there is data to send, then a further determination is made as to whether the data to be sent is a select state, such as an invalid state or other unique state, to cause another unit, such as Unit 2 (100b), to perform a function, INQUIRY 302. If it is not a select state being sent, then the data is sent via a standard bus communication to a receiver 350 (e.g., MCU 104b) of another unit, such as Unit 2 (100b), STEP 304.

Otherwise, if a select state is being sent, then a select state communication is sent to receiver 350, and, in accordance with an aspect of the present invention, to a device, such as a unique state detector (USD) 310, STEP 306. In one example, the select state communication includes reconfiguring the pins of the micro-controller unit to provide an invalid state signal that is sent to unique state detector 310. In one embodiment, the data and/or other signals sent at STEP 304 may also be forwarded to detector 310, but without any consequence (e.g., without initiating the function).

In one embodiment, unique state detector 310 includes an optional filter/delay used in processing of the received signal, STEP 312. For instance, a delay may be provided to determine whether the signal being received is a select state. The filter/delay is coupled to a timer/logic detector used to detect whether the received signal is a select state, INQUIRY 314. For instance, the timer/logic determines whether the signal has stayed at a predetermined state, e.g., low for a predetermined amount of time. If it is determined that the signal is not a select state, then processing continues with STEP 312. Otherwise, if the timer/logic detects a select state, processing continues with another optional delay, if desired, STEP 316. This delay depends, for instance, on the application and whether a delay is desired prior to initiating the function. Thereafter, a signal is generated to perform a select function, such as reset, interrupt, enable/disable, sleep/wake-up, etc., STEP 318. The generated signal (e.g., reset signal) is sent to receiver 350.

Figure 4:
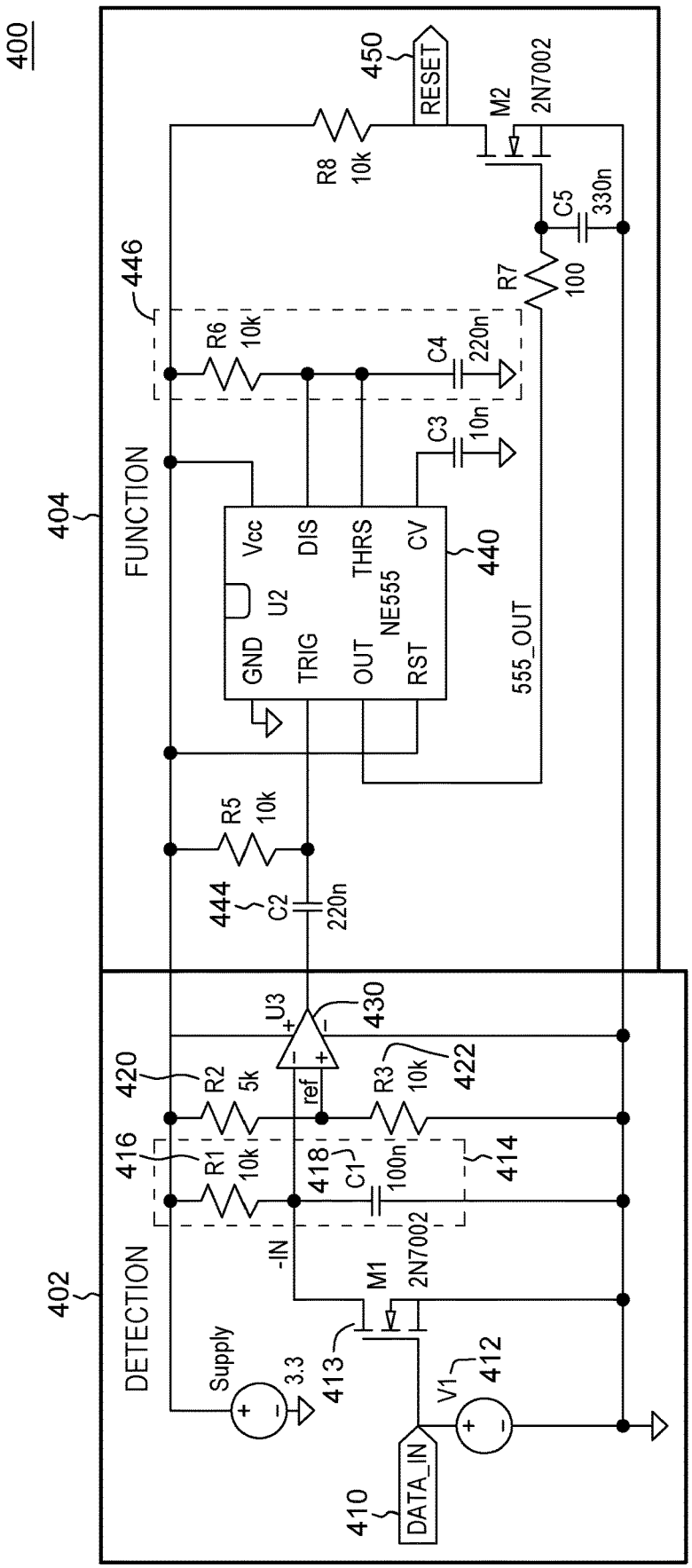
FIG. 4 depicts one example of circuits of a unique state detector, in accordance with an aspect of the present invention.

Further details relating to a unique state detector are described with reference to FIG. 4. In one example, a unique state detector (e.g., USD 310, 110a and/or 110b) is a circuit 400 including a first portion 402 used for detection of a select state and a second portion 404 used for, at least, initiating a function based on detecting the select state.

In one embodiment, first portion 402 includes an input, which is, for instance, Data_In (410). Data_In is, for instance, the UART RX line connected at the Data_In as a voltage, V1 (412). V1 goes through a circuit 413 and is inverted (−IN). The inverted input is input to a timer delay 414, which includes, for instance, a resistor R1 (416), and a capacitor C1 (418). When the signal remains in a particular state, e.g., low, for a predefined amount of time (e.g., $>R1*C1*-1*\ln(1-(R3/(R2+R3)))$, where ln is the natural log; R1 is, e.g., R1 (416); C1 is, e.g., C1 (418); R2 is, e.g., R2 (420); and R3 is, e.g., R3 (422)), then the voltage slowly rises according to the values of two components, e.g., resistor R1 (416) and capacitor C1 (418). The two components control the time it takes the voltage to rise until a threshold (e.g., defined by, e.g., the ratio of R2 (420) and R3 (422)) is crossed, triggering a comparator circuit 430 to switch state at the output. Based on the state changing, a trigger of function 404 occurs. For example, circuit NE555 (440) is triggered. When the detection occurs, a reset line 450, which is normally at a high voltage, is pulled to a low voltage and held there for a predefined amount of time, e.g., 2.4 ms (e.g., $1.1*R6*C4=2.4$ ms), and then released. A coupling capacitor, C2 (444), ensures that the function does not remain in a repeating state if the input remains low indefinitely (either intentionally or due to a hung bus). Once triggered, circuit 440 is configured to emit a single pulse that can be used to cause the MCU to, e.g., reset by pulling it low. Further, in one example, circuit 440 may be coupled to another delay 446.

Figure 5:
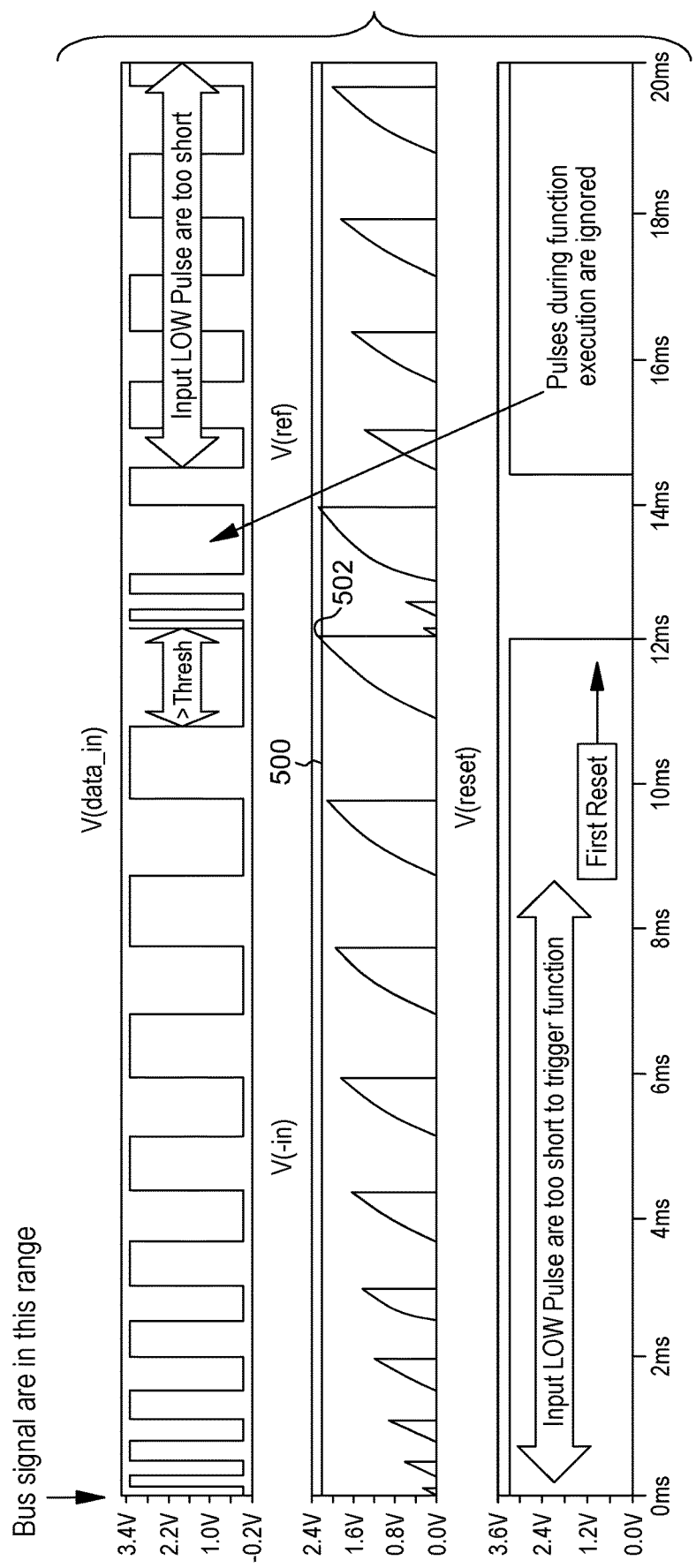
FIG. 5 depicts one example of a select signal being detected by the unique state detector resulting in performing a function, in accordance with an aspect of the present invention.

Simulated results of using USD circuit 400 are shown in FIG. 5. As shown, the line indicated by 500 is the threshold line set by R2 (420) and R3 (422). When that line is crossed (e.g., 502), the reset line is pulled low for a period of time.

As described herein, a unique state detector is used to detect a select state forced by one component (e.g., micro-controller unit 104a) causing a function to be triggered for another component (e.g., micro-controller unit 104b).

One or more aspects of the present invention are inextricably tied to computer technology and facilitate processing within a computer, improving performance thereof. In one example, processing of a micro-controller is improved by being able to initiate a function on the micro-controller, such as a reset, interrupt, enable/disable, sleep/wake-up function, based on detecting a select signal provided via a standard bus coupling the micro-controller with another micro-controller that forced the select state, without needing additional cables, interface signals and/or shielding.

As an example, the micro-controller unit for which the function is triggered is coupled to a detector configured to detect the select signal and initiate a function based thereon. The select signal detected is an additional state not usually detected using the dedicated wires, connector pins and input/output resources of the bus and/or the component. The existing bus architecture is used to generate additional useful signals, such as reset or interrupt. This is useful, for instance, when multiple sub-designs are connected throughout a system where connectors are limited in number and size and micro-controllers are limited in I/O ports. It is also useful, e.g., when one side of the interface is fixed and is not to deviate from the defined interface signals. For a system that interconnects via wires of some form, this technique can reduce the cable size and cost.

In one example, as described herein, a timing scheme is used to detect the select state. For example, in an UART communication, the TX and RX lines are held high when not communicating. During activity, the lines may bounce low for some time, but should not remain low indefinitely. The length of time these signals can remain low is dependent on the baud and packet settings. Using these settings, a maximum possible length of time either signal can remain low can be determined. The USD can then be configured to detect when either signal remains low for longer than that time. Once detected, the USD can be designed to perform some function. Normal activity will not trigger the USD circuit. One example of a function performed by the USD is the generation of a reset signal to a micro-controller. Other functions may also be performed.

In one particular example, for a unit, such as Unit 1, to generate a reset on another unit, such Unit 2, Unit 1 forces an invalid state to occur. At the same time, this is not acknowledged by the protocol and will have no further implication on Unit 1. Additional reset wires and an I/O pin from the MCU are not needed.

Further, in one example, the reset signal is not exposed across the distance from Unit 1 to Unit 2. The reset signal can be kept very close to the MCU so that no outside noise or disturbances may falsely trigger the reset. Furthermore, a reset wire is not defined by the UART protocol, so it would not be present in standard cabling and MCUs.

By using the USD, system resources, such as GPIO, are saved; unique cabling is not needed; costs are reduced; and noise immunity for sensitive signals is improved.

Although the unique state detector is described with respect to hardware, one or more aspects may be implemented in software, firmware, hardware and/or any combination thereof. For instance, it may be implemented using a micro-controller and/or firmware. Other variations are possible. One example of the hardware used to implement the detector are circuits, such as function circuits that include, but are not limited to, logic, timing, and/or memory (flip/flop) circuits. Other variations and embodiments are possible.

As described herein, the select state that is detected is based on the protocol of the bus. In the example provided herein, the protocol is the UART (Universal Asynchronous Receiver-Transmitter) protocol and the select state is persistent low; however, other protocols and/or states are possible. For example, for the following protocols, the select states are as follows: SPI (Serial Peripheral Interface), persistent low; I2C (Inter-Integrated Circuit Bus), persistent low; CAN (Controller Area Network), persistent high; USB (Universal Serial Bus), unchanging voltage; Ethernet, unchanging voltage; GPIO (General-Purpose Input/Output), user defined; Parallel, user defined; and PWM (Pulse-Width Modulation), user defined. Other protocols and/or other states are possible.

The environments described herein are only examples of environments that can be used. Other environments, including but not limited to, non-partitioned environments, partitioned environments, and/or emulated environments, may be used; embodiments are not limited to any one environment.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
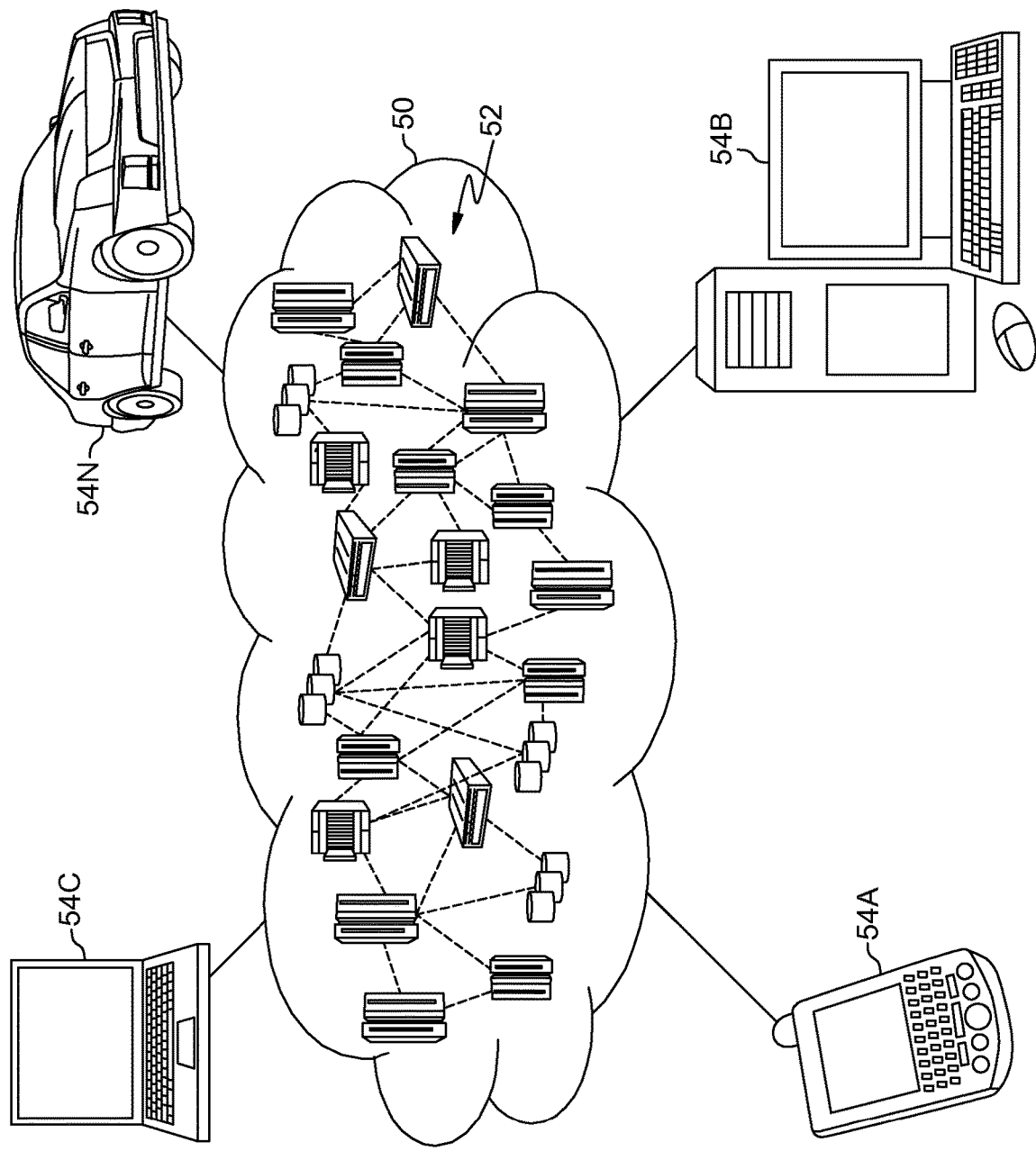
FIG. 6 depicts one embodiment of a cloud computing environment.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
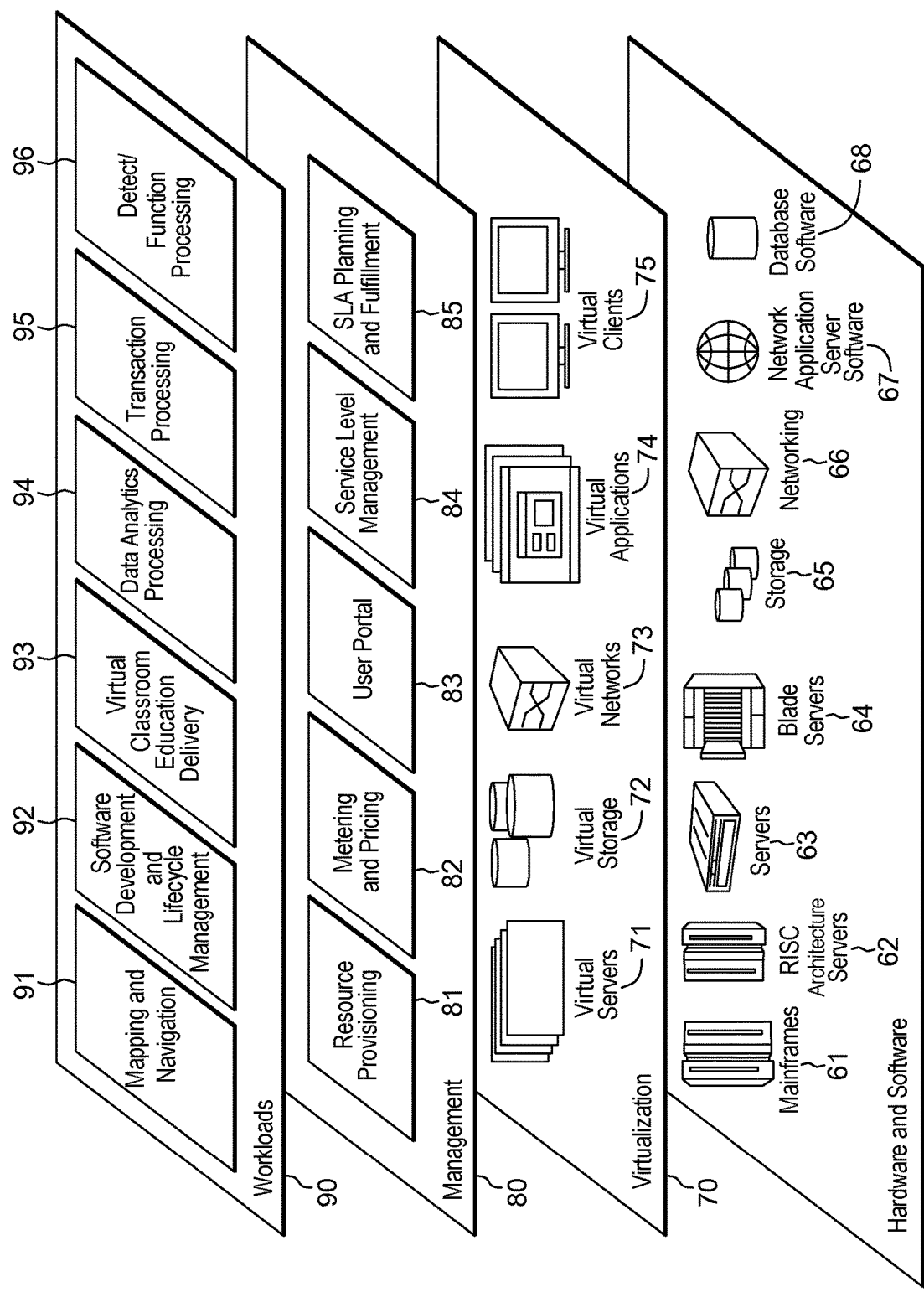
FIG. 7 depicts one example of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detect/function processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other computing environments, components and/or devices can be used to incorporate and use one or more embodiments. Further, different protocols, states and/or functions may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A state detector comprising:
one or more circuits to detect a select state forced by one component of one unit and to initiate a function for another component of another unit based on detecting the select state, wherein the state detector is configured to:
receive a signal sent over a bus to be used to communicate between the one component of the one unit and the other component of the other unit, the bus being defined based on a selected protocol, and the state detector being configured to communicate with the other component of the other unit;
determine whether the signal represents the select state, the select state being an unintended state of the selected protocol of the bus, in which the select state is not reachable by the one component that forced the select state, based on the one component being configured to the selected protocol of the bus, but is reachable by the one component, based on an intentional change associated with the one component to force the select state; and
initiate the function based on determining that the signal represents the select state.

2. The state detector of claim 1, wherein the select state is an invalid state provided by reconfiguring one or more pins of the one component.

3. The state detector of claim 1, wherein the function is a reset of the other component of the other unit, the other unit including the state detector.

4. The state detector of claim 3, wherein the initiating the reset of the other component includes generating a reset signal to be sent to the other component to reset the other component.

5. The state detector of claim 1, wherein the other component is a micro-controller unit.

6. The state detector of claim 1, wherein the bus is unaltered to receive the signal in that additional shielding, cabling or interface signals are not added to the bus to receive the signal.

7. The state detector of claim 1, further configured to delay the received signal for a predetermined amount of time subsequent to receiving the signal and prior to determining whether the signal represents the select state.

8. The state detector of claim 1, further configured to perform a delay subsequent to determining the signal represents the select state and prior to initiating the function.

9. The state detector of claim 1, wherein to determine whether the signal represents the select state comprises detecting whether the signal remained at a particular state for a select amount of time, the particular state being dependent on the selected protocol of the bus, wherein the signal represents the select state based on detecting that the signal remained at the particular state for the select amount of time.

10. The state detector of claim 9, wherein the particular state is a low state.

11. A method of initiating a function, the method comprising:
detecting a select state forced by one component of one unit and initiating a function for another component of another unit based on detecting the select state, comprising:
receiving by a state detector a signal sent over a bus to be used to communicate between the one component of the one unit and the other component of the other unit, the bus being defined based on a selected protocol, and the state detector being configured to communicate with the other component of the other unit;
determining whether the signal represents the select state, the select state being an unintended state of the selected protocol of the bus, in which the select state is not reachable by the one component that forced the select state, based on the one component being configured to the selected protocol of the bus, but is reachable by the one component, based on an intentional change associated with the one component to force the select state; and
initiating the function based on determining that the signal represents the select state.

12. The method of claim 11, wherein the select state is an invalid state provided by reconfiguring one or more pins of the one component.

13. The method of claim 11, wherein the function is a reset of the other component of the other unit, the other unit including the state detector.

14. The method of claim 13, wherein the initiating the reset of the other component includes generating a reset signal to be sent to the other component to reset the other component.

15. The method of claim 11, wherein the other component is a micro-controller unit.

16. The method of claim 11, wherein the bus is unaltered to receive the signal in that additional shielding, cabling or interface signals are not added to the bus to receive the signal.

17. The method of claim 11, further comprising performing a delay of the received signal for a predetermined amount of time subsequent to receiving the signal and prior to determining whether the signal represents the select state.

18. The method of claim 11, further comprising performing a delay subsequent to determining the signal represents the select state and prior to initiating the function.

19. The method of claim 11, wherein the determining whether the signal represents the select state comprises detecting whether the signal remained at a particular state for a select amount of time, the particular state being dependent on the selected protocol of the bus, wherein the signal represents the select state based on detecting that the signal remained at the particular state for the select amount of time.

20. The method of claim 19, wherein the particular state is a low state.

* * * * *